US012499164B2

(12) United States Patent
Hoxie et al.

(10) Patent No.: US 12,499,164 B2
(45) Date of Patent: Dec. 16, 2025

(54) CONTROLLING PRECISION OF SEARCHES

(71) Applicant: Elasticsearch B.V., Mountain View, CA (US)

(72) Inventors: Quinlan J. Hoxie, San Francisco, CA (US); Nick Chow, Vancouver (CA); Aurelien Foucret, Loos (FR)

(73) Assignee: ELASTICSEARCH B.V., Amsterdam (NL)

(*) Notice: Subject to any disclaimer, the term of this patent is extended or adjusted under 35 U.S.C. 154(b) by 0 days.

(21) Appl. No.: 17/245,749

(22) Filed: Apr. 30, 2021

(65) Prior Publication Data

US 2022/0350849 A1 Nov. 3, 2022

(51) Int. Cl.
*G06F 16/9535* (2019.01)
*G06F 16/904* (2019.01)
*G06F 16/9532* (2019.01)
*G06F 16/9538* (2019.01)

(52) U.S. Cl.
CPC ........ *G06F 16/9535* (2019.01); *G06F 16/904* (2019.01); *G06F 16/9532* (2019.01); *G06F 16/9538* (2019.01)

(58) Field of Classification Search
CPC .. G06F 16/904; G06F 16/951; G06F 16/9532; G06F 16/9535; G06F 16/9536; G06F 16/9538
See application file for complete search history.

(56) References Cited

U.S. PATENT DOCUMENTS

| 6,519,597 B1 | 2/2003 | Cheng et al. |
| 7,945,533 B2 | 5/2011 | Krishnaprasad et al. |
| 8,352,519 B2 | 1/2013 | Nath |
| 8,615,794 B1 | 12/2013 | Tomilson et al. |
| 8,898,261 B1 | 11/2014 | Patsenker et al. |
| 8,930,332 B2 | 1/2015 | Burstein |

(Continued)

FOREIGN PATENT DOCUMENTS

| CN | 106528797 A | 3/2017 |
| CN | 106934062 A | 7/2017 |

(Continued)

OTHER PUBLICATIONS

"Extended European Search Report", European Patent Application No. 21167941.0, Sep. 6, 2021, 10 pages.

(Continued)

*Primary Examiner* — Kris E Mackes

(57) ABSTRACT

Provided are methods and systems for controlling precision of searches. An example method includes receiving, via a user interface associated with a search engine, user input indicating a search precision level, and setting, based on the search precision level, parameters of the search engine to cause the search engine to return, in a response to a search query, search results having the search precision level. The method includes collecting statistical data including a value of the search precision level, a number of executions of the search query by the search adjusted based on the value of the search precision level, and a number of user reactions to results of the executions of the search query. The method includes determining, based on the statistical data, an optimal value of the search precision level for the search query.

20 Claims, 8 Drawing Sheets

(56) References Cited

U.S. PATENT DOCUMENTS

| | | | |
|---|---|---|---|
| 9,015,301 B2 | 4/2015 | Redlich et al. | |
| 9,519,712 B2* | 12/2016 | Goodall | G06F 16/951 |
| 9,734,180 B1 | 8/2017 | Graham et al. | |
| 10,360,268 B2* | 7/2019 | DeLuca | G06F 16/3326 |
| 10,410,224 B1 | 9/2019 | Leavanon et al. | |
| 10,541,983 B1 | 1/2020 | Khashei Varnamkhasti et al. | |
| 10,891,165 B2 | 1/2021 | Willnauer | |
| 10,997,204 B2 | 5/2021 | Leskes | |
| 11,182,093 B2 | 11/2021 | Leskes | |
| 11,188,531 B2 | 11/2021 | Leau | |
| 2005/0004892 A1 | 1/2005 | Brundage et al. | |
| 2005/0114397 A1 | 5/2005 | Doshi et al. | |
| 2006/0075079 A1 | 4/2006 | Powers et al. | |
| 2009/0276215 A1 | 11/2009 | Hager | |
| 2010/0094879 A1 | 4/2010 | Donnelly et al. | |
| 2010/0174677 A1 | 7/2010 | Zahavi | |
| 2011/0134764 A1 | 6/2011 | Venkatapadmanaabhan | |
| 2011/0191319 A1* | 8/2011 | Nie | G06F 16/3338 707/706 |
| 2011/0264651 A1 | 10/2011 | Selvaraj et al. | |
| 2011/0282839 A1 | 11/2011 | Paksoy et al. | |
| 2012/0233118 A1 | 9/2012 | Holt et al. | |
| 2012/0233299 A1 | 9/2012 | Attanasio et al. | |
| 2013/0086039 A1 | 4/2013 | Salch et al. | |
| 2013/0297469 A1 | 11/2013 | Spittle et al. | |
| 2014/0012814 A1 | 1/2014 | Bercovici et al. | |
| 2014/0157224 A1 | 6/2014 | Capuozzo et al. | |
| 2014/0279871 A1 | 9/2014 | Ochoa et al. | |
| 2014/0330785 A1 | 11/2014 | Isherwood et al. | |
| 2015/0280999 A1 | 10/2015 | Chart et al. | |
| 2015/0293955 A1 | 10/2015 | Dickey | |
| 2015/0379083 A1 | 12/2015 | Lang et al. | |
| 2016/0085839 A1 | 3/2016 | D'Halluin et al. | |
| 2016/0127517 A1 | 5/2016 | Shcherbakov | |
| 2016/0191509 A1 | 6/2016 | Bestler et al. | |
| 2016/0203168 A1 | 7/2016 | Gangadharappa | |
| 2016/0203174 A1 | 7/2016 | Shahane et al. | |
| 2016/0224600 A1 | 8/2016 | Munk | |
| 2016/0292171 A1 | 10/2016 | Bhagat et al. | |
| 2017/0024453 A1 | 1/2017 | Raja et al. | |
| 2017/0078167 A1 | 3/2017 | Bansal | |
| 2017/0124151 A1 | 5/2017 | Ji et al. | |
| 2017/0193041 A1 | 7/2017 | Fuchs | |
| 2017/0371926 A1 | 12/2017 | Shiran et al. | |
| 2018/0189328 A1 | 7/2018 | Frazier et al. | |
| 2018/0268000 A1 | 9/2018 | McManus et al. | |
| 2019/0026336 A1 | 1/2019 | Tian | |
| 2019/0124105 A1 | 4/2019 | Chauhan | |
| 2019/0266271 A1 | 8/2019 | Leau | |
| 2020/0050612 A1 | 2/2020 | Bhattacharjee et al. | |
| 2020/0084213 A1 | 3/2020 | Taropa | |
| 2020/0133550 A1 | 4/2020 | Willnauer | |
| 2020/0176098 A1 | 6/2020 | Lucas et al. | |
| 2020/0201879 A1 | 6/2020 | Leskes | |
| 2020/0233692 A1 | 7/2020 | Kandula | |
| 2020/0326986 A1 | 10/2020 | Willnauer | |
| 2020/0328936 A1 | 10/2020 | Pérez-Aradros Herce et al. | |
| 2020/0348878 A1 | 11/2020 | Leskes | |
| 2021/0015263 A1 | 1/2021 | Lah | |
| 2021/0124620 A1 | 4/2021 | Willnauer | |
| 2021/0126977 A1 | 4/2021 | Ruflin et al. | |
| 2021/0240731 A1 | 8/2021 | Leskes | |
| 2022/0035555 A1 | 2/2022 | Leskes | |
| 2022/0050844 A1 | 2/2022 | Leau | |
| 2022/0075646 A1 | 3/2022 | Landau et al. | |

FOREIGN PATENT DOCUMENTS

| | | | |
|---|---|---|---|
| EP | 3899710 A1 | 10/2021 | |
| GB | 2592130 A | 8/2021 | |
| WO | WO2020131330 A1 | 6/2020 | |

OTHER PUBLICATIONS

"International Search Report" and "Written Opinion of the International Searching Authority," Patent Cooperation Treaty Application No. PCT/US2019/063437, Feb. 7, 2020, 8 pages.

Tedor, Jason, "Introduce Cross-Cluster Replication"; GitHub [online], Sep. 5, 2017 [retrieved Jan. 24, 2020], retrieved from the Internet: <https://github.com/elastic/elasticsearch/issues/30086>, 9 pages.

Kline, K., "SQL in a Nutshell", O'Reilly Media, Inc., Dec. 2000 [Retrieved on Jul. 28, 2020], Retrieved from the Internet: <https://learning.oreilly.com/library/view/sql-in-a/1565927443/>, 10 pages.

Bradford, Ronald, "SQL, ANSI Standards, PostgreSQL and MySQL", Retrieved from the Internet: <URL http://ronaldbradford.com/blog/sql-ansi-standards-postgresql-and-mysql-2015-03-26/, Mar. 26, 2015 [retrieved on Jun. 4, 2021], 33 pages.

"Can i use elasticsearch-sql to convert sql to DSL?", GitHub, Retrieved from the Internet: <URL https://github.com/NLPchina/elasticsearch-sql/issues/156>, Feb. 2016 [retrieved on Jul. 29, 2020], 4 pages.

Andhavarapu, Abhishek, "Beginners guide to querying Elasticsearch (Scoring vs Sorting)", Retrieved from the Internet: <URL https://abhishek376.wordpress.com/2017/07/06/begginers-guide-to-querying-elasticsearch/, Jul. 6, 2017 [retrieved on Jun. 4, 2021], 10 pages.

"Extended European Search Report", European Patent Application No. 21165715.0, Dec. 10, 2020, 7 pages.

"Office Action", British Patent Application No. GB 2104443.3, Aug. 16, 2021, 9 pages.

"Office Action", British Patent Application No. GB2105205.5, Oct. 4, 2021, 11 pages.

* cited by examiner

700 

Collect statistical data including a value of the search precision level, a number of executions of the search query by the search engine adjusted based on the value of the search precision level, and a number of user reactions to results of the executions of the search query
705

Determine, based on the statistical data, an optimal value of the search precision level for the search query
710

*FIG. 7*

CONTROLLING PRECISION OF SEARCHES

TECHNICAL FIELD

This disclosure relates to computers. More specifically, this disclosure relates to systems and methods for controlling precision of searches.

BACKGROUND

Search systems are widely used by enterprises to allow customers to search products and services online. Some search systems may allow changing parameters of the searches to tune results of searches executed in response to customers queries. However, current solutions do not provide for setting parameters of searches to control ranges and precision of the search results.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Generally, the present disclosure is directed to systems and methods for controlling precision of searches. Some embodiments of the present disclosure may allow administrators of search engines of enterprises to control precision and relevancy of results of search queries provided by customers.

According to one example embodiment of the present disclosure, a method for controlling precision of searches is provided. The method may include receiving, via a user interface or application programming interface (API) associated with a search engine, user input indicating a search precision level. The method includes setting, based on the search precision level, parameters of the search engine to cause the search engine to return, in response to a search query, search results having the search precision level.

The search precision level can be set individually per a search query executed by the search engine, where the search query includes specific search terms. Additionally, the search precision level can be set per a specific category of search query executed by the search engine. In some embodiments, the search precision level can be set for all types of search queries executed by the search engine. The search precision can be determined by matching terms of the search query with a relevance metric. The method may include determining, by the search engine, a default value for the precision level based on a type of a data source being used to perform the search query.

The method may also include displaying, via the user interface, the search results, receiving, via the user interface, further user input indicating a further search precision level. The method may include setting the parameters of the search engine based on the further search precision level. The method may also include executing, by the search engine, the search query to obtain further search results having the further search precision level. The method may include displaying, via the user interface, the further search results.

The method may also include collecting statistical data. The statistical data may include a set of entries, wherein an entry of the set of entries includes a value of the search precision level, a number of executions of the search query by the search adjusted based on the value of the search precision level, and a number of user reactions to results of the executions of the search query. The method may allow determining, based on the statistical data, an optimal value of the search precision level for the search query. The number of user reactions can be a number of selections of items in the results of executions of the search query. The number of user reactions can include a number of purchases of items in the results of executions of the search query. The optimal parameter can be determined by machine learning.

According to another embodiment, a system for event sequences search is provided. The system may include at least one processor and a memory storing processor-executable codes, wherein the processor can be configured to implement the operations of the above-mentioned method for controlling precision of searches.

According to yet another aspect of the disclosure, there is provided a non-transitory processor-readable medium, which stores processor-readable instructions. When the processor-readable instructions are executed by a processor, they can cause the processor to implement the above-mentioned method for controlling precision of searches.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF DRAWINGS

Exemplary embodiments are illustrated by way of example and not limitation in the figures of the accompanying drawings, in which like references indicate similar elements.

FIG. 7 is a flow chart of an example method for determining an optimal precision of searches, according to some example embodiments.

DETAILED DESCRIPTION OF EXAMPLE EMBODIMENTS

Figure 1:
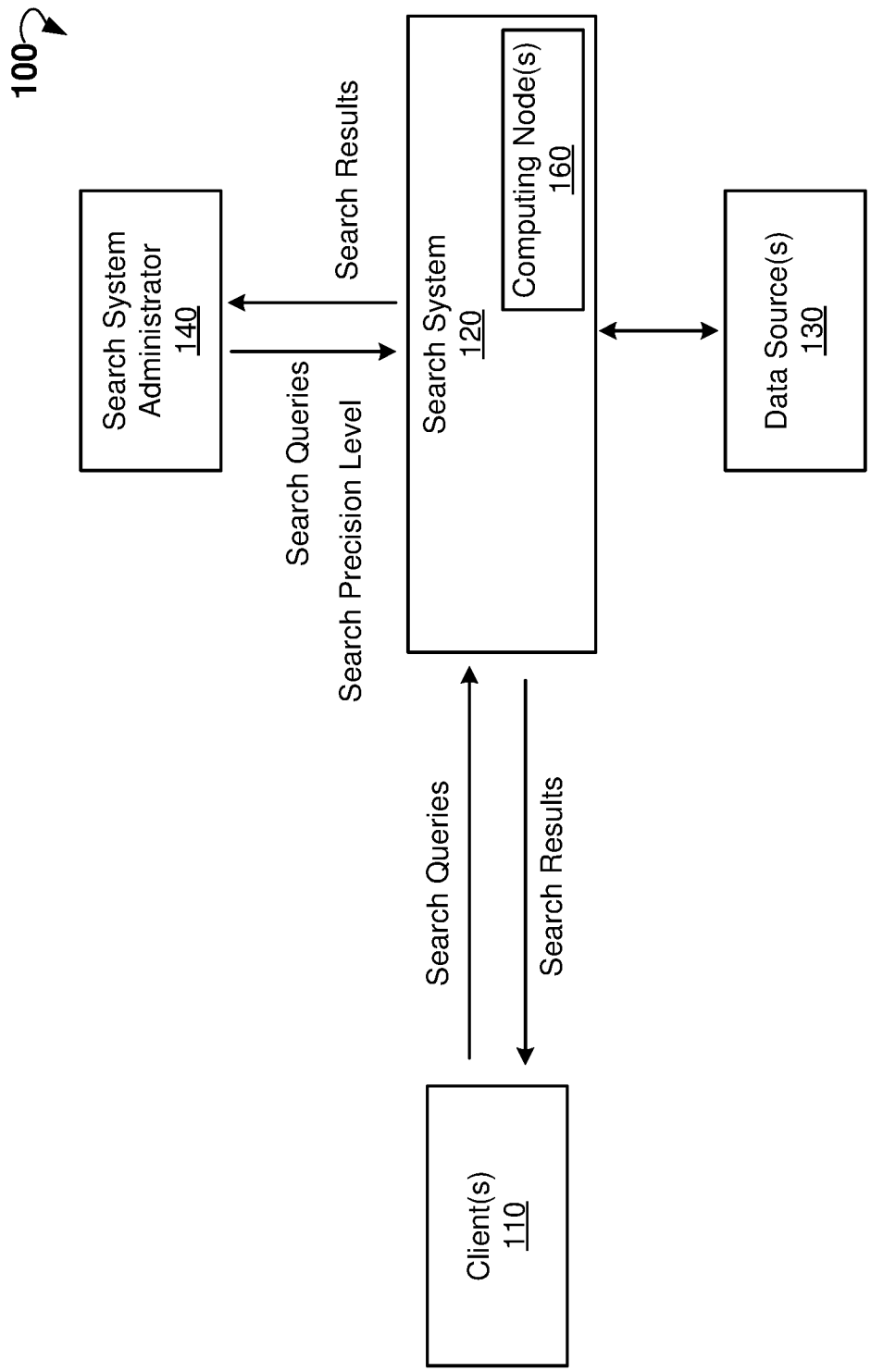
FIG. 1 is a block diagram of an example environment suitable for practicing methods for controlling precision of searches as described herein.

The technology disclosed herein is concerned with methods and systems for controlling precision of searches. Embodiments of the present disclosure may allow administrators of search engines of enterprises to control precision and relevancy of results of search queries requested by customers of the enterprise. Specifically, embodiments of the present disclosure may allow specifying a precision level of results, and, thus, control ranges of results returned in response to the search queries. Providing the precision level may not necessarily cause the search engines to return the results with the precision equal exactly to the specified precision level, but rather may instruct the search engines to be more strict or more flexible in selecting results. Setting a higher precision level may instruct the search engines to return fewer false positives. Similarly, setting lower precision level may instruct the search engine to return more false positives. While example embodiments of the present disclosure are concerned with online searches of products in online stores, further embodiments of the present disclosure may be used for other searches, such as web searches, document searches, email searches, and so forth.

Unlike existing technologies, embodiments of the present disclosure may allow an administrator of a search system to specify a single parameter indicative of the precision level of results of the search queries. The precision level can be individual to a search query with specific search terms or a specific category of the search queries. Some embodiments of the present disclosure may allow analyzing customer responses to results of a search query to determine optimal value for the precision level for the search query.

According to one example embodiment of the present disclosure, a method for controlling precision of searches may include receiving, via a user interface associated with a search engine, user input indicating a search precision level. The method may include setting, based on the search precision level, parameters of the search engine to cause the search engine to return, in a response to a search query, search results having the search precision level.

Referring now to the drawings, various embodiments are described in which like reference numerals represent like parts and assemblies throughout the several views. It should be noted that the reference to various embodiments does not limit the scope of the claims attached hereto. Additionally, any examples outlined in this specification are not intended to be limiting and merely set forth some of the many possible embodiments for the appended claims.

FIG. 1 shows a block diagram of an example environment 100 suitable for practicing methods described herein. It should be noted, however, that the environment 100 is just one example and is a simplified embodiment provided for illustrative purposes, and reasonable deviations of this embodiment are possible as will be evident to those skilled in the art.

As shown in FIG. 1, the environment 100 may include one or more client(s) 110, a search system 120, one or more data source(s) 130, and a search system administrator 140. In various embodiments, the client(s) 110 and the search system administrator 140 may include, but are not limited to, a laptop computer, a tablet computer, a desktop computer, and so forth. The client (s) 110 and the search system administrator 140 can include any appropriate device having network functionalities allowing the client(s) 110 and the search system administrator 140 to communicate to the search system 120. In some embodiments, the client(s) 110 and the search system administrator 140 can be connected to the search system 120 via one or more wired or wireless communications networks.

In some embodiments, the search system 120 may include one or more computing node(s) 160. The search system 120 may further include network switches and/or routers for connecting the one or more computing node 160. The search system 120 can be connected to the data source(s) 130 via networks. The search system 120 and the data source(s) 130 can be implemented as computer system 800 described in FIG. 8.

In some embodiments, the computing node(s) 160 may be configured to store indexes of data from the data source(s) 130. The one or more computing node(s) 160 may perform searches in response to search queries from the client(s) 110 and the search system administrator 140, execute the search queries over the data source(s) 130, and provide results of the search queries to the client(s) 110 and the search system administrator 140.

In some embodiments, the data source(s) 130 may store data related to an enterprise. In various embodiments, data in data source(s) 130 may include one or more of the following: databases of enterprise's products to be searched in online stores, enterprise's documents and emails, records of purchases of the products, enterprise website pages, customers records, and so forth. The data stored in data source(s) 130 can be indexed for facilitating the searches performed by the computing node(s) 160. The customers may initiate searches by submitting search queries via a user interface of the search system 120. The user interface can be accessible via the client(s) 110 and the search system administrator 140. The search system 120 may receive, via the user interface, from the search system administrator 140, settings affecting results of the search queries. For example, the search system 120 may receive parameters affecting the precision of the results of the search queries, for example, a desired search precision level.

Figure 2:
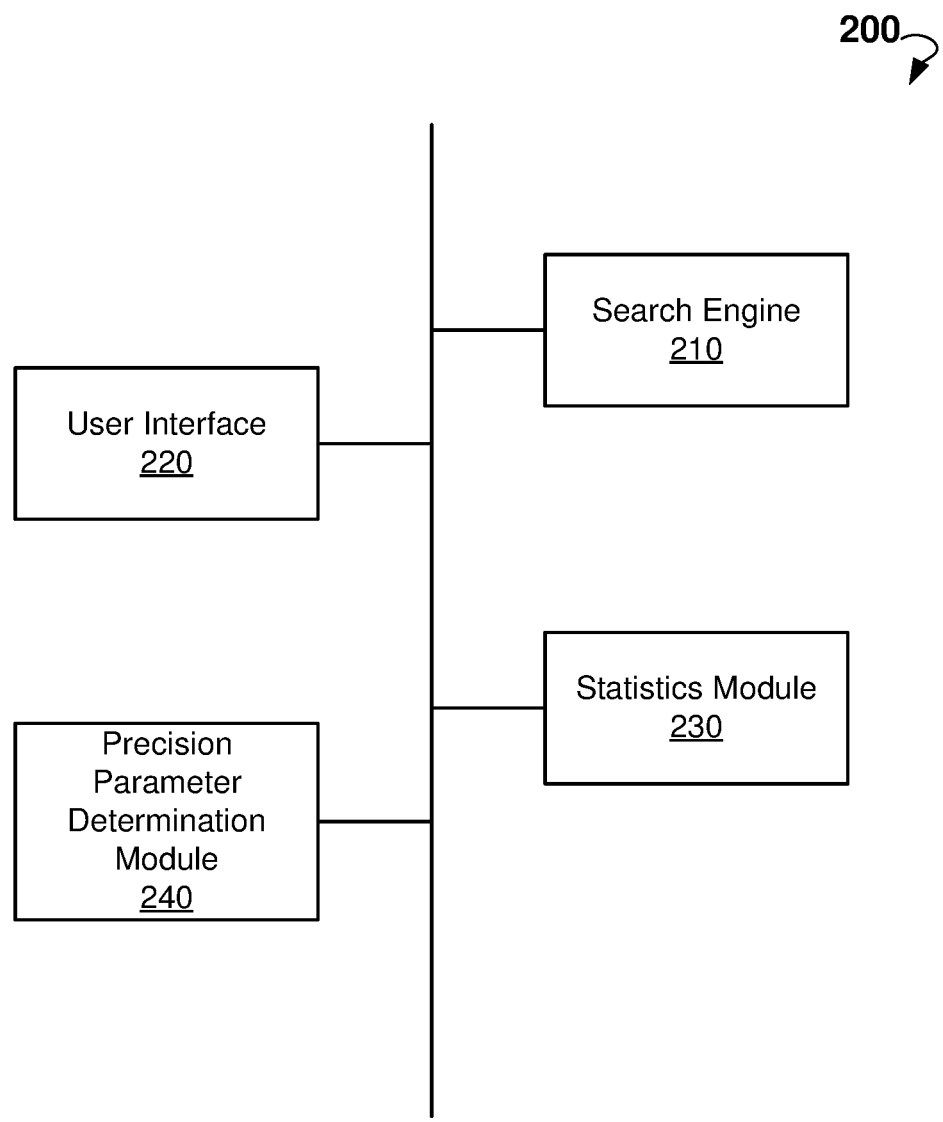
FIG. 2 is a block diagram showing an example system for controlling precision of searches, according to some example embodiments.

FIG. 2 is a block diagram showing an example system 200 for controlling precision of searches, according to some example embodiments. The system 200 may include a search engine 210, a user interface 220, a statistics module 230, and a precision parameter determination module 240. The modules 210-240 can be implemented as instructions stored in a memory of the search system 120 and executable by one or more computing node(s) 160.

The search engine 210 can be configured to receive a search query and execute the search query over the data in data source(s) 130. The search engine 210 may apply one or more relevance metrics for matching one or more terms of the search query to indexes of the data. The search engine 210 may return the results of the search query in the descending order starting with results having the highest relevance metrics. The relevance metrics can be based on weights assigned to individual terms in the search query.

The search queries can be provided to the search engine 210 from the client(s) 110. Some of the terms in the search queries can be viewed and specified by customers when creating the search queries on the client(s) 110. Additional terms of the search queries can be added by the search engine 210 prior to executing the search queries over the data in data source(s) 130.

An administrator of the search system 120, may adjust, via the user interface 220, weights of individual terms (either viewable by customers or added by the search engine 210) to control the results of the search queries. Additionally, the administrator of the search system 120 may specify a precision level of the results of the search queries.

Figure 3:
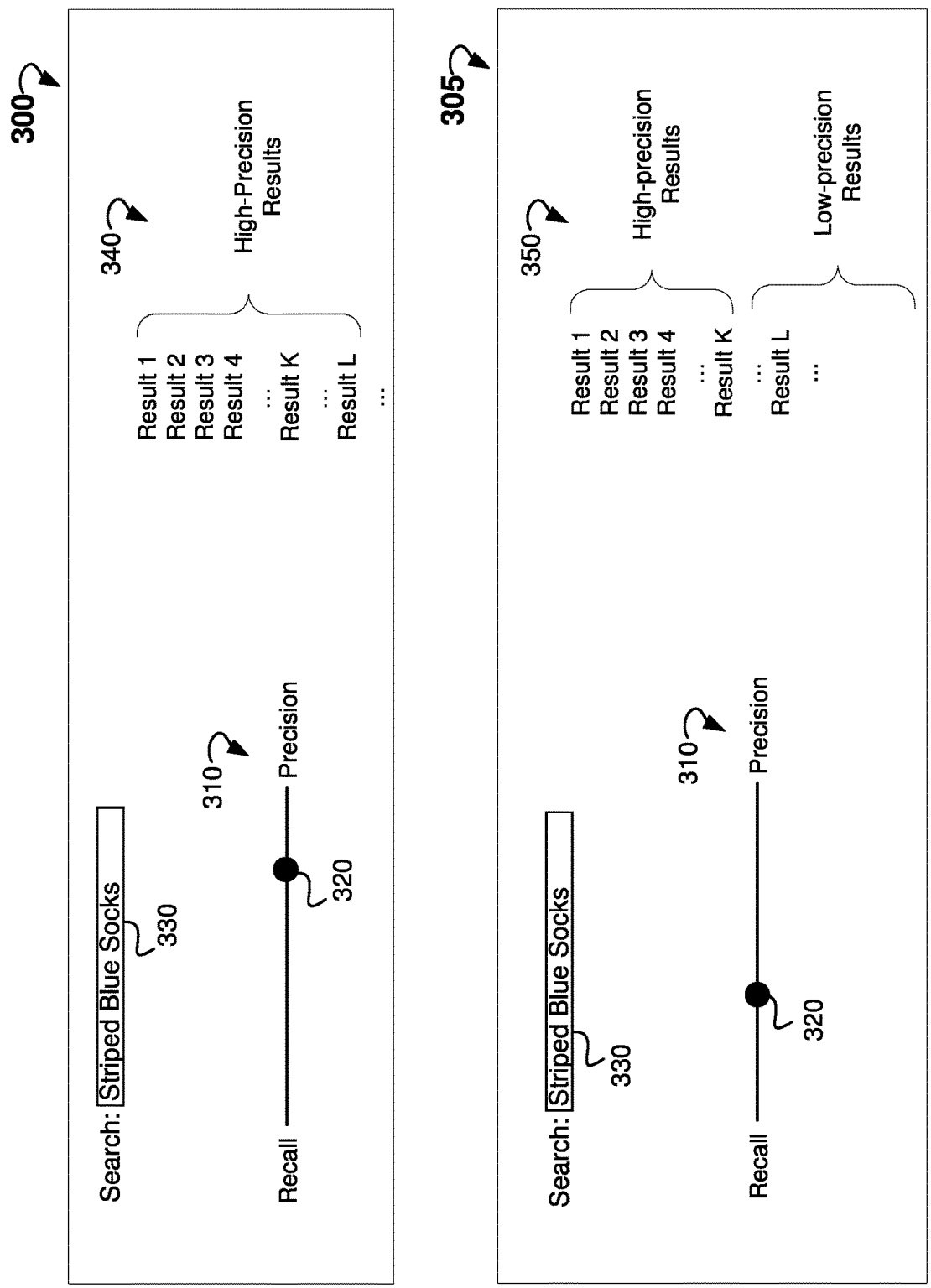
FIG. 3 shows screens of a system for controlling precision of searches, according to some example embodiments.

FIG. 3 shows example screens 300 and 305 of the system 120 for controlling accuracy of searches, according to some example embodiments. The screen 300 includes a selector 310, a sliding button 320, an example search query 330, and results 320 of execution of the search query. The sliding button 330 can be used to set a desired precision level of the result of query. In other words, sliding button 330 can be used to determine a balance between high-precision results ("precision") of the search query and low-precision results ("recall") of the search query. The high-precision results may include entries in a database that matches all terms in the search query 330. The low-precision results may include entries in a database that does not match one or more terms in the search query 330 or match the query using only more flexible interpretations of the terms. The flexible interpretation of terms may include matching words in query to stem, base, or root of the words.

The screen 305 includes the selector 310, the sliding button 320, the search query 330, and results 350 showing results of the search query. The results 350 correspond to a new position of the sliding button 320 in the selector 310, which indicates a smaller precision level than the position of the sliding button 320 in the screen 300. Accordingly, results 350 may include more low-precision results than the results 340.

An administrator of the search system 120 may move the sliding button 320 and review the results 350 in real time. Thus, by moving the sliding button 320, the administrator of the search system 120 may set a desired balance between high-precision results and low-precision results for the search query. For example, it may be desired to display to customers, in response to search query "striped blue socks", not only the striped socks, but other blue socks that are present in the database. Presenting products of a wider range than the customers expected in response to the search query may suggest to the customers to review and select more products than they would if the search system returned only exact matches to the search query.

User interfaces similar to the screens 300 and 305 can be used to allow setting balance between high-precision results and low-precision results globally for all possible search queries or individually for a specific query or category of queries.

Referring back to the FIG. 2, the search engine 210 may adjust parameters of the search in such a way that the results of search will satisfy the desired precision level. The search engine 210 may modify weights of search terms in relevancy metrics. The search engine 210 may also modify thresholds used to determine that an entry from a database accurately matches the search query. The search engine may also inspect results of the search to select, based on values relevance metrics of entries in the results, number of high-precision results and number of low-precision results such that a percentage of the high-precision results would correspond to the desired precision level.

The statistical module 230 may be configured to collect statistical data. The statistical data may include a plurality of entities. Each of the plurality of entities may include terms of the search query, category of the search query, value for the precision level for which the search query was executed, and number of customer responses, upon reviewing the results of the search query. The customer responses may include an indication that a customer has selected an item from the results of the search query. The customer responses may include an indication that a customer has purchased the item from the results of the search query.

Figure 4:
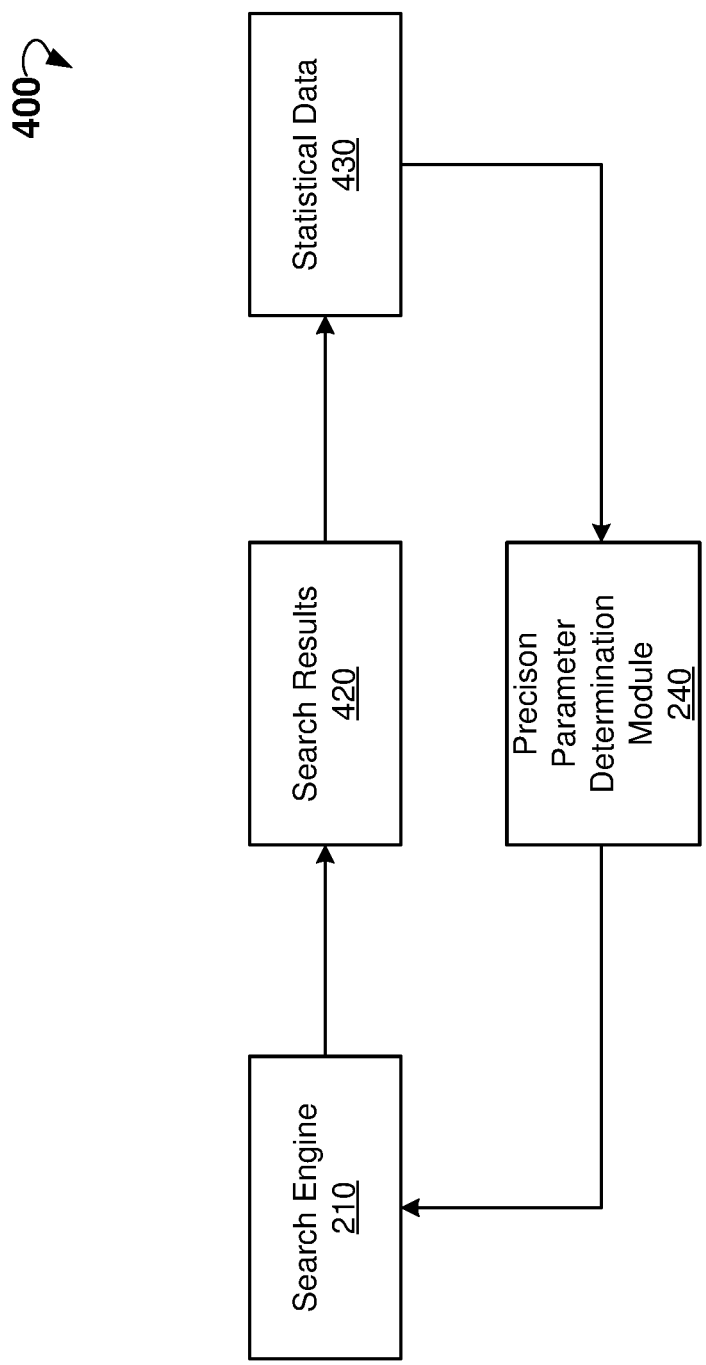
FIG. 4 is a block diagram showing functionalities of modules of a system for controlling precision of searches, according to some example embodiments.

FIG. 4 is a block diagram showing functionalities 400 of the precision parameter determination module 240, according to some example embodiments. The precision parameter determination module 240 may receive statistical data 430 from the statistical module 230. The statistical data 430 may include statistics concerning customer responses for a specific search query or a specific category of the search queries. The precision parameter determination module 240 may determine, based on the statistical data 430, an optimal value for the precision level of the specific search query and an optimal value for the precision level for the specific category of the search queries to maximize customer responses.

The optimal values can be provided to the search engine 210 and presented to an administrator of the search system 120 each time the administrator selects the precision level using screen 300 shown in the FIG. 3. The optimal values for the precision level can be recalculated periodically based on updated search results 420 and statistical data 430. In some embodiments, the optimal values for the precision level can be determined using one or more machine learning techniques.

Figure 5:
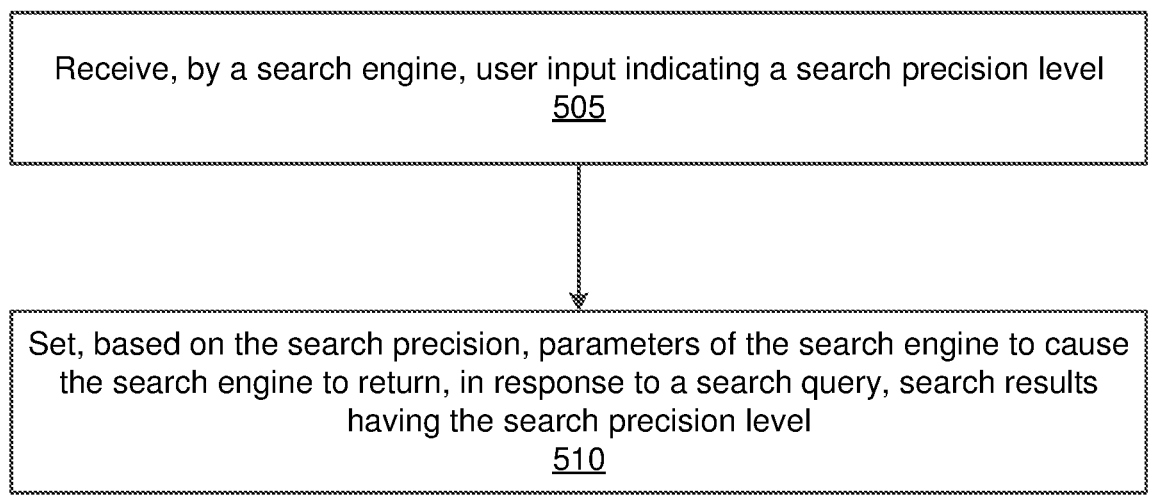
FIG. 5 is a flow chart of an example method for controlling precision of searches, according to some example embodiments.

FIG. 5 is a flow chart of an example method 500 for controlling precision of searches, according to some example embodiments. The method 500 may be performed within environment 100 illustrated in FIG. 1 by the search system 120. Notably, the method 500 may have additional steps not shown herein, but which can be evident to those skilled in the art from the present disclosure.

The method 500 may commence in block 505 with receiving, via a user interface or an API associated with a search engine, user input indicating a search precision level. In block 510, the method 500 may proceed with setting, based on the search precision level, parameters of the search engine to cause the search engine to return, in a response to a search query, search results having the desired search precision level. In some embodiments, the search engine may determine that the precision level has increased with respect to a previous precision level. Based on the determination, the search engine can be adjusted to return a smaller number of false positives than at the previous precision level. Accordingly, if the precision level has decreased with respect to the previous precision level, the search engine can be adjusted to return a larger number of false positives than at the previous precision level.

The search precision level can be set individually per an individual search query executed by the search engine, wherein the search query has specific search terms. Additionally, the search precision level can be set individually per a specific category of search query executed by the search engine. In some embodiments, the search precision level can be set for all types of search queries executed by the search engine. The search precision can be determined by matching terms of the search query with a relevance metric.

Figure 6:
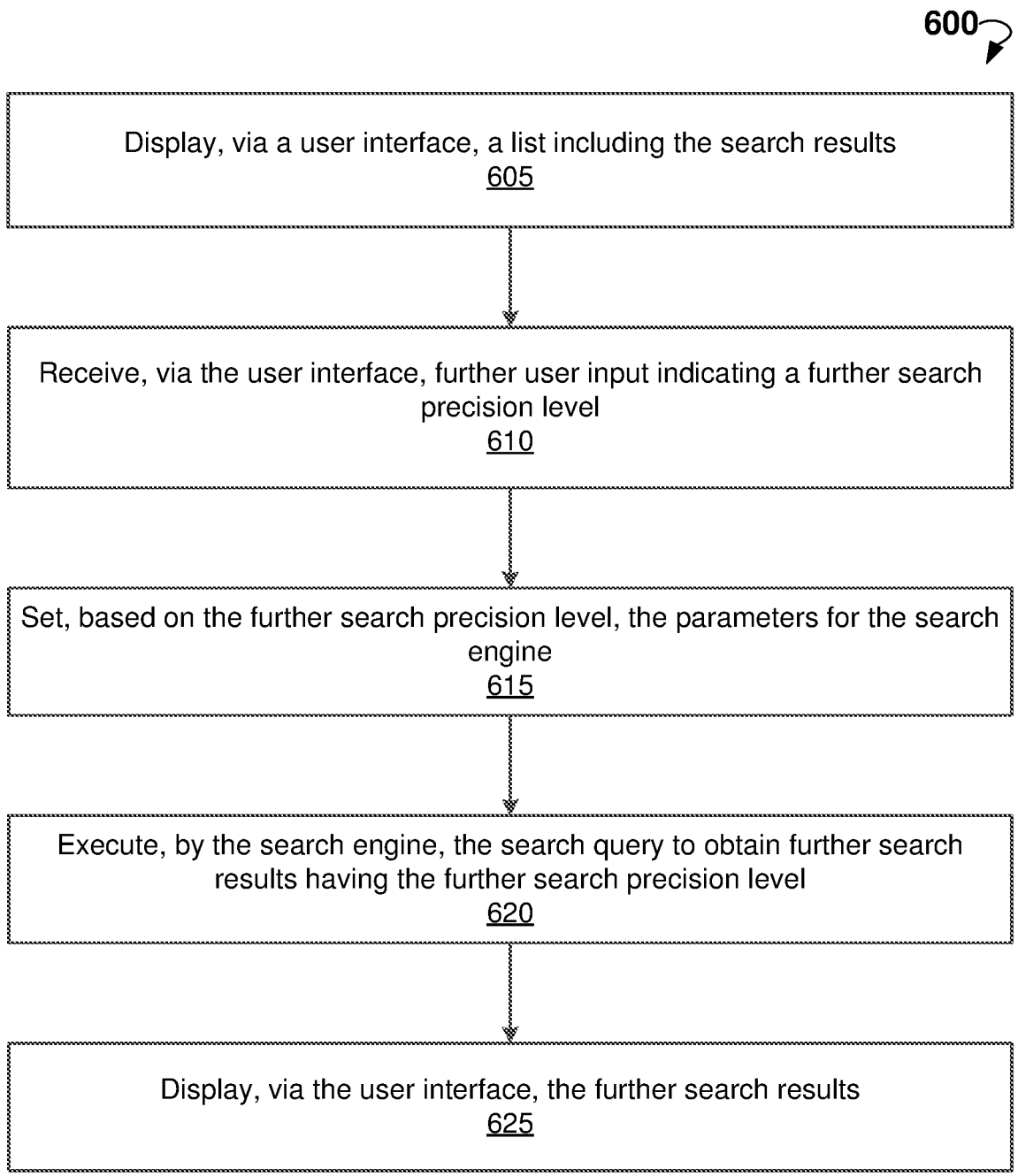
FIG. 6 is a flow chart of an example method for controlling precision of searches, according to some example embodiments.

FIG. 6 is a flow chart of an example method for controlling precision of searches, according to some example embodiments. The method 600 can be performed within environment 100 illustrated in FIG. 1 by the search system 120. The method 600 may be a continuation of the method 500 of FIG. 5.

The method 600 may commence in block 605 with displaying, via a user interface, the search results. In block 610, the method 600 may proceed with receiving, via the user interface, a further user input indicating a further search precision level.

In block 615, the method 600 may include setting, based on the further search precision level, the parameters of the search engine. In block 620, the method 600 may include executing, by the search engine, the search query to obtain further search results having the further search precision level. In block 625, the method 600 may include displaying, via the user interface, the further search results.

FIG. 7 is a flow chart of an example method 700 for determining an optimal precision of searches, according to some example embodiments. The method 700 can be performed within environment 100 illustrated in FIG. 1 by the search system 120. The method 700 may be a continuation of the method 500 of FIG. 5.

In block 705, the method may commence with collecting statistical data including a set of entries. An entry in the statistical data may include a value of the search precision level, a number of executions of the search query by the search adjusted based on the value of the search precision level, and a number of user reactions to results of the executions of the search query. The number of user reactions is a number of selections of items in the results of executions of the search query. The number of user reactions is a number of purchases of items in the results of executions of the search query.

In block 710, the method 700 may proceed determining, based on the statistical data, an optimal value of the search precision level for the search query. The optimal parameter can be determined by machine learning. In some embodiments, a default value for the precision level can be determined without collecting statistical data. The default value for the precision level can be determine, for example, based on a type of one or more data sources being used to perform the search queries.

Figure 8:
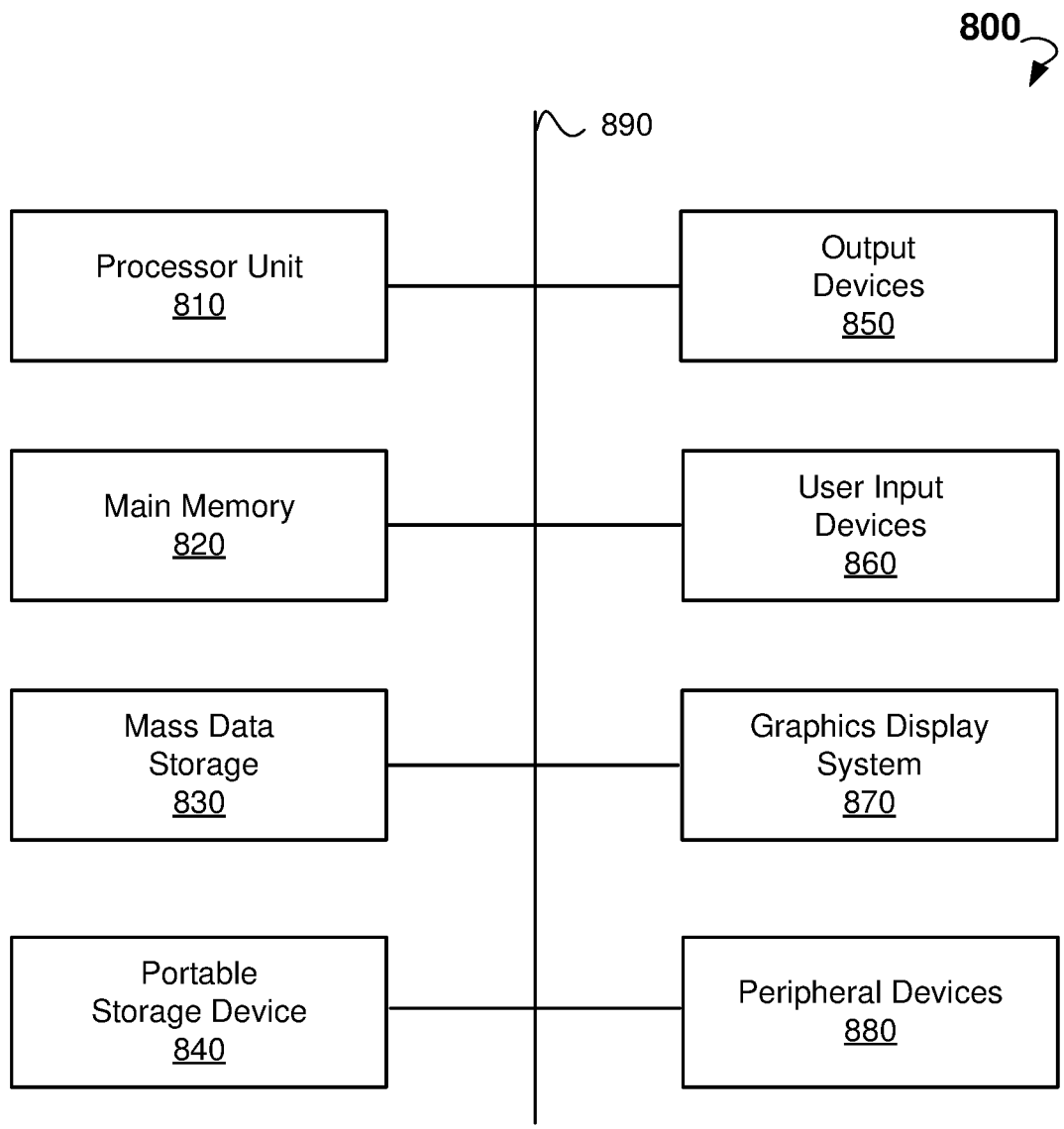
FIG. 8 is an example computer system that can be used to implement some embodiments of the present disclosure.

FIG. 8 illustrates an exemplary computer system 800 that may be used to implement some embodiments of the present disclosure. The computer system 800 of FIG. 8 may be implemented in the contexts of the likes of the client(s) 110, the search system 120, computing node(s) 160, the search system administrator 140, and data source(s) 130. The computer system 800 of FIG. 8 includes one or more processor units 810 and main memory 820. Main memory 820 stores, in part, instructions and data for execution by processor units 810. Main memory 820 stores the executable code when in operation, in this example. The computer system 800 of FIG. 8 further includes a mass data storage 830, portable storage device 840, output devices 850, user input devices 860, a graphics display system 870, and peripheral devices 880.

The components shown in FIG. 8 are depicted as being connected via a single bus 890. The components may be connected through one or more data transport means. Processor unit 810 and main memory 820 are connected via a local microprocessor bus, and the mass data storage 830, peripheral device(s) 880, portable storage device 840, and graphics display system 470 are connected via one or more input/output (I/O) buses.

Mass data storage 830, which can be implemented with a magnetic disk drive, solid state drive, or an optical disk drive, is a non-volatile storage device for storing data and instructions for use by processor unit 810. Mass data storage 830 stores the system software for implementing embodiments of the present disclosure for purposes of loading that software into main memory 820.

Portable storage device 840 operates in conjunction with a portable non-volatile storage medium, such as a flash drive, floppy disk, compact disk, digital video disc, or Universal Serial Bus (USB) storage device, to input and output data and code to and from the computer system 800 of FIG. 8. The system software for implementing embodiments of the present disclosure is stored on such a portable medium and input to the computer system 800 via the portable storage device 840.

User input devices 860 can provide a portion of a user interface. User input devices 860 may include one or more microphones, an alphanumeric keypad, such as a keyboard, for inputting alphanumeric and other information or a pointing device, such as a mouse, a trackball, stylus, or cursor direction keys. User input devices 860 can also include a touchscreen. Additionally, the computer system 800 as shown in FIG. 8 includes output devices 850. Suitable output devices 850 include speakers, printers, network interfaces, and monitors.

Graphics display system 870 can include a liquid crystal display (LCD) or other suitable display device. Graphics display system 870 is configurable to receive textual and graphical information and process the information for output to the display device.

Peripheral devices 880 may include any type of computer support device to add additional functionality to the computer system.

The components provided in the computer system 800 of FIG. 8 are those typically found in computer systems that may be suitable for use with embodiments of the present disclosure and are intended to represent a broad category of such computer components that are well known in the art. Thus, the computer system 800 of FIG. 8 can be a personal computer (PC), handheld computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX, ANDROID, IOS, CHROME, TIZEN, and other suitable operating systems.

The processing for various embodiments may be implemented in software that is cloud-based. In some embodiments, the computer system 800 is implemented as a cloud-based computing environment, such as a virtual machine operating within a computing cloud. In other embodiments, the computer system 800 may itself include a cloud-based computing environment, where the functionalities of the computer system 800 are executed in a distributed fashion. Thus, the computer system 800, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 800, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

The present technology is described above with reference to example embodiments. Therefore, other variations upon the example embodiments are intended to be covered by the present disclosure.

What is claimed is:

1. A method for controlling precision of searches, the method comprising:
   receiving, by a search engine, user input indicating a search precision level, wherein the user input is received during an active search session;
   collecting statistical data including a set of entries, wherein an entry of the set of entries includes a value of the search precision level, a number of executions of a search query by the search engine adjusted based on the value of the search precision level, and a number of user reactions to results of the executions of the search query, wherein the number of user reactions includes at least a number of purchases and selections of items in the results of executions of the search query;
   determining, based on the statistical data, an optimal value of the search precision level for the search query using a machine learning technique; and
   dynamically adjusting and setting, based on the optimal value of the search precision level, parameters of the search engine to cause the search engine to iteratively return, in response to the search query, search results having the search precision level.

2. The method of claim 1, wherein the search precision level is dynamically adjusted for each individual search query executed by the search engine based on specific user-provided search terms.

3. The method of claim 1, wherein the search precision level is set per a specific category of the search query executed by the search engine.

4. The method of claim 1, wherein the search precision level is set for all types of search queries executed by the search engine.

5. The method of claim 1, further comprising determining, by the search engine, a default value for the search precision level based on a type of a data source being used to perform the search query.

6. The method of claim 1, further comprising:
   displaying the search results via a user interface;
   receiving, via the user interface, further user input indicating an updated search precision level;
   setting, based on the updated search precision level, the parameters of the search engine;
   executing, by the search engine, the search query to obtain further search results having further search precision level; and
   displaying, via the user interface, the further search results without requiring a complete re-execution of the search query.

7. The method of claim 1, wherein the number of user reactions includes a number of selections of items in the results of executions of the search query.

8. The method of claim 1, wherein the optimal value is determined using a machine learning technique.

9. A system for controlling precision of searches, the system comprising:
   at least one processor; and
   a memory communicatively coupled to the at least one processor, the memory storing instructions executable by the at least one processor to perform a method comprising:
      receiving, by a search engine, user input indicating a search precision level, wherein the user input is received during an active search session;
      collecting statistical data including a set of entries, wherein an entry of the set of entries includes a value of the search precision level, a number of executions of the search query by the search engine adjusted based on the value of the search precision level, and a number of user reactions to results of the executions of the search query, wherein the number of user reactions includes at least a number of purchases and selections of items in the results of executions of the search query;
      determining, based on the statistical data, an optimal value of the search precision level for the search query using a machine learning technique; and
      dynamically adjusting and setting, based on the optimal value of the search precision level, parameters of the search engine to cause the search engine to iteratively return, in response to a search query, search results having the search precision level.

10. The system of claim 9, wherein the search precision level is set per an individual search query executed by the search engine, the search query having specific search terms.

11. The system of claim 9, wherein the search precision level is set per a specific category of the search query executed by the search engine.

12. The system of claim 9, wherein the search precision level is set for all types of search queries executed by the search engine.

13. The system of claim 9, further comprising determining, by the search engine, a default value for the search precision level based on a type of a data source being used to perform the search query.

14. The system of claim 9, further comprising:
   displaying the search results via a user interface;
   receiving, via the user interface, further user input indicating a further search precision level;
   setting, based on the further search precision level, the parameters the search engine;
   executing, by the search engine, the search query to obtain further search results having the further search precision level; and
   displaying, via the user interface, the further search results.

15. The system of claim 9, wherein the number of user reactions includes a number of selections of items in the results of executions of the search query.

16. A non-transitory computer-readable storage medium having embodied thereon instructions, which when executed by at least one processor, perform steps of a method, the method comprising:
   receiving, by a search engine, user input indicating a search precision level, wherein the user input is received during an active search session;
   collecting statistical data including a set of entries, wherein an entry of the set of entries includes a value of the search precision level, a number of executions of a search query by the search engine adjusted based on the value of the search precision level, and a number of user reactions to results of the executions of the search query, wherein the number of user reactions includes at least a number of purchases and selections of items in the results of executions of the search query;
   determining, based on the statistical data, an optimal value of the search precision level for the search query using a machine learning technique; and
   dynamically adjusting and setting, based on the optimal value of the search precision level, parameters of the search engine to cause the search engine to iteratively return, in response to a search query, search results having the search precision level.

17. The non-transitory computer-readable storage medium of claim 16, wherein the search precision level is dynamically adjusted for each individual search query executed by the search engine based on specific user-provided search terms.

18. The non-transitory computer-readable storage medium of claim 16, wherein the search precision level is set per a specific category of the search query executed by the search engine.

19. The non-transitory computer-readable storage medium of claim 16, wherein the search precision level is set for all types of search queries executed by the search engine.

20. The non-transitory computer-readable storage medium of claim 16, further comprising:
- determining, by the search engine, a default value for the search precision level based on a type of a data source being used to perform the search query.

* * * * *